United States Patent [19]

Dannhaeuser

[11] Patent Number: 4,928,098

[45] Date of Patent: May 22, 1990

[54] METHOD FOR CODE PROTECTION USING AN ELECTRONIC KEY

[75] Inventor: Friedrich Dannhaeuser, Munich, Fed. Rep. of Germany

[73] Assignee: Siemens Aktiengesellschaft, Berlin and Munich, Fed. Rep. of Germany

[21] Appl. No.: 263,403

[22] Filed: Oct. 27, 1988

Related U.S. Application Data

[63] Continuation-in-part of Ser. No. 925,696, Oct. 29, 1986, abandoned, which is a continuation-in-part of Ser. No. 595,399, Mar. 30, 1984, abandoned.

[51] Int. Cl.[5] .......................... H04Q 3/02; H04Q 7/00

[52] U.S. Cl. .......................... 340/825.56; 340/825.69; 340/825.31; 340/825.34; 361/171

[58] Field of Search ...................... 340/825.31, 825.34, 340/825.72, 825.69, 825.56, 825.3; 455/603, 604; 235/382, 382.5; 361/171, 172

[56] References Cited

U.S. PATENT DOCUMENTS

| | | | |
|---|---|---|---|
| 4,535,333 | 8/1985 | Twardowski | 340/825.69 |
| 4,596,985 | 6/1986 | Bongard et al. | 340/825.31 X |
| 4,652,860 | 3/1987 | Weishaupt et al. | 340/825.69 X |
| 4,825,210 | 4/1989 | Bachhuber et al. | 340/825.31 |

FOREIGN PATENT DOCUMENTS 2051211A 1/1981 United Kingdom .

*Primary Examiner*—Benedict V. Safourek
*Assistant Examiner*—Ralph Smith
*Attorney, Agent, or Firm*—Hill, Van Santen, Steadman & Simpson

[57] ABSTRACT

In a method for code protection of an electronic key, a plurality of codes n are stored in a transmitter and in a receiver and a new, coinciding code is automatically set in the transmitter and in the receiver after each transmission and reception event, respectively. The code transmitted by the transmitter contains information for the receiver with respect to which code is to be selected from the stored set of codes as the next code to be utilized.

1 Claim, 2 Drawing Sheets

METHOD FOR CODE PROTECTION USING AN ELECTRONIC KEY

RELATED APPLICATIONS

This application is a continuation-in-part of application Ser. No. 925,696, filed Oct. 29, 1986 now abandoned, which, in turn, is a continuation of application Ser. No. 595,399, filed Mar. 30, 1984, now abandoned.

BACKGROUND OF THE INVENTION

1. Field of the Invention

The present invention relates to a method for code protection using an electronic key system for a motor vehicle having a built-in central electronic lock, the electronic key comprising a transmitter which generates a coded infrared signal that is picked-up by an electronic lock receiver tuned to the coded infrared signal. Identical sequences of codes or code words are stored or generated in both the transmitter and receiver. The transmitter and receiver are automatically set to a new coinciding code or code word after each transmitting or receiving event, respectively.

2. Description of the Prior Art

With electronic keys that employ a transmitter that beams out a coded infrared signal which is subsequently decoded by a receiver of an electronic lock, there is a danger that the coded infrared signal can be intercepted or otherwise picked-up by a random receiver. The intercepted signal can be stored and then later reproduced so that unauthorized persons are also able to activate the electronic lock and thus open, for example, the lock of a motor vehicle.

The coded infrared signal can be intercepted by having the intercepting receiver located within the emission range of the infrared transmitter, or by receiving the coded infrared signal after it has been reflected from a surface such as glass.

The possibility of interception of the coded infrared signal can be minimized by bringing the transmitter and receiver into close proximity with each other so that a second intercepting receiver does not lie within the emission range region of the transmitter. However, with motor vehicles, since the electronic lock receivers are located within the interiors of the vehicles, there is always the danger that the infrared signal will be reflected off of the windows of the vehicles, and thus, the interception of reflected signals cannot practically be avoided. Additionally, requiring placement of the transmitter in close proximity with the receiver runs contrary to the easy manipulation and use of such electronic keys and locks, as one can no longer activate the electronic lock at a distance.

An electronic key system in which it is possible to adjust the authorized code at both the transmitter and receiver by way of switches is known from British Letters Patent GB No. 2,051,211A. Because the code can be changed often by means of changing the switch settings, unauthorized activation of the electronic lock associated with the key can be made more difficult. A danger exists, however, that the transmitter and receiver can be set to different codes so that activation of the electronic lock is no longer possible. Experience has also shown that a user is not likely to set a new code at the transmitter and at the receiver after each unlocking event, so that unauthorized activation of the electronic lock, for example of a motor vehicle, by means of reproduction of an intercepted signal, is not impossible.

SUMMARY OF THE INVENTION

The object of the present invention is to provide a method of code protection employing an electronic key system in which an unauthorized activation of an electronic lock by interception of the coded signal beamed out by the transmitter is prevented in a reliable manner, and whereby a synchronization between the transmitter and receiver can be achieved in a simple manner given a transmitter and receiver that have somehow been placed out of sync with each other.

The above object is achieved in that the coded signal broadcast by the transmitter contains information for the receiver as to which code or code word is to be selected next from a set of stored or generated sequence of codes.

An advantage is achieved by the invention in that the receiver accepts information for the selection of the next code or code word, even when the transmitter and receiver are set to different codes so that, while a first unlocking or activation attempt is fruitless, the transmitter and receiver of the electronic key system will operate synchronously the next time the actuating key is pressed. Thus, an out of sync transmitter and receiver pair can be placed back into synchronization.

DESCRIPTION OF THE PREFERRED EMBODIMENTS

Figure 1:
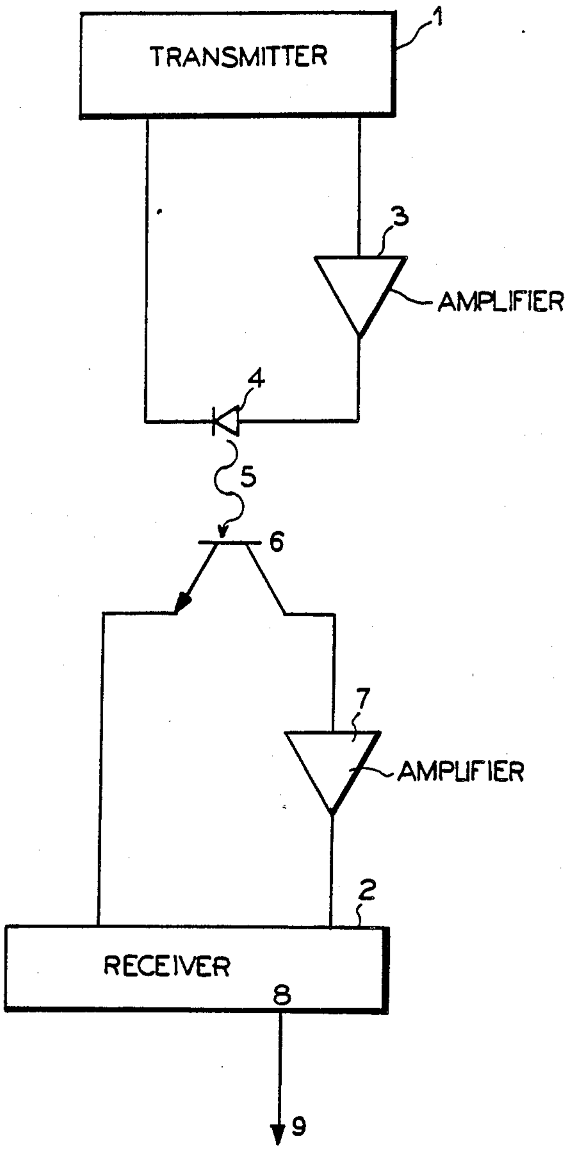
FIG. 1 is a schematic representation of an electronic lock system.

With reference to FIG. 1, an electronic key system comprises a transmitter 1 and a receiver 2 which may be coupled by infrared transmission. By way of an amplifier 3, for example, the transmitter 1 drives a photodiode 4 which emits an infrared signal 5 which is picked up by a phototransistor 6. The infrared signal is coded and additionally contains information for the receiver 2 with respect to which code or code word is to be selected as the next code from a set of stored or generated codes. Code and code words are used interchangeably throughout the specification and claims. The signal of the phototransistor 6 is supplied by way of an amplifier 7 to the receiver 2 at the output 8 of which a signal 9 appears. The signal 9 can be utilized by an electronic lock such as the central lock of a motor vehicle to activate the lock to an open position.

As an example, the transmitter 1 and the receiver 2 are each composed of a complementary metal-oxide-semiconductor (CMOS) microprocessor having the amplifiers 3 and 7 connected thereto, respectively, as well as an infrared transmission diode 4 and an infrared phototransistor 6, respectively. A receiver diode, of course, can be substituted for the phototransistor 6.

The microprocessor of each of the transmission unit 1 and of the receiving unit 2 includes a read only memory (ROM) in which identical sequences of authorized code combinations are stored or generated. Each code combination sequence can be stored in the form of a table or, with less memory expense, in the form of an algorithm, which is executed by the respective microprocessor to determine the appropriate code or code number to be transmitted or matched.

In any case, there is a fixed relationship between continuous numbers 0--n and n+1 different codes. For example, in the table below, there are n+1 codes, each having one of the index designations CO to Cn associated therewith as well as a code comprised of a nine digit number. Only the code is transmitted by the transmitter 1.

| | Code Index | | Code |
|---|---|---|---|
| 0 . . . | CO | = | 532984135 |
| 1 . . . | Cl | = | 147355264 |
| 2 . . . | C2 | = | 672974825 |
| . | . | | |
| . | . | | |
| . | . | | |
| n . . . | Cn | = | 921536132 |
| 0 . . . | CO | = | 532984135 |
| 1 . . . | Cl | = | 147355264 |
| 2 . . . | C2 | = | 672974825 |

The codes are cyclically traversed and it is assumed that n is a large number and that a sequence of the codes exhibits an apparently random form. A great plurality of coding possibilities is therefore achieved in a simple manner.

Given what is referred to as an "m-bit message," this yields $2^m$ combinations of codes. With m=24, for example, there can be over 16 million combinations.

If M codes are allocated per electronic lock, then the number of possibilities per lock is M while the number of sets of possibilities is, in fact, the total number of possibilities reduced by a multiplication factor of 1/M. For example, if 10 codes are allocated per electronic lock, then the number of sets of possibilities is $2^m/M$, or reduced to about 1.6 million. However, when the sequence O to M is considered, then M! permutations of the sequence of these codes are available per electronic lock. For example, if M=10, i.e., 10 codes per lock, then there are 3.6 million permutations available. Given M=11, about 40 million permutations are available. Thus, a sequence of n codes can have about 40 million codes, while only 11 different codes are utilized.

These code combinations are selected in a suitable manner and are stored in both the transmitter 1 and the receiver 2 in the manner set forth above (i.e., in tabular or algorithmic form), so it is assured during manufacture that an electronic lock operates with only one code set, i.e., that there is only one electronic key per electronic lock.

The transmitter 1 and the receiver 2 further contain number counters that are set to 0 at the beginning, i.e., at manufacture. The transmitter therefore sends the code associated with the index CO and subsequently increments the index CO by 1 so that at the next transmission, it transmits the next code in the sequence. The receiver 2 compares the received code to the code associated with the code at location CO from its own memory or, alternatively, to its own calculation in the case of a stored algorithm. When the received code coincides with the stored or calculated code, the signal 9 appears at the output 8 of the receiver 2, and the electronic lock, for example the central lock of a motor vehicle, is activated or opened by way of the signal 9. Subsequently, the number counter of the receiver is incremented by 1 to Cl. A repeat transmission of the code CO (i.e., an attempted unauthorized activation of the electronic lock) therefore remains ineffective. The next time, the transmitter 1 sends the next valid code associated with the index Cl, and so forth. The transmitter 1 therefore increments its counter at each transmission; the receiver 2 only increments its counter given reception of a valid code. Codes from other transmitters are therefore ignored.

It can be appreciated that the index designations Cn are merely illustrated. The actual counter values or indices can be of any suitable type. C stands for code, while the numeral indicates the index location of the code. For example, 1 indicates the first code of the selected sequence.

When each signal of the transmitter 1 also, in fact, reaches the receiver 2 and the counters of the transmitter and receiver are set identically, then the two operate in a synchronized fashion. When, however, a transmitted signal does not reach the receiver 2 or does not reach it completely, then only the transmitter increments by 1, not the receiver 2. In these cases, the receiver 2 will reject all further codes as being invalid until the correct code is transmitted again. But this will not occur until after the transmitter sequences through the interval of all n codes. If the interval is very large, for example, 40 million codes, then it can take a very long time to resynchronize the transmitter and receiver.

In order to alleviate this nuisance, use is made of the fact that information for the next valid number is associated with each code. No added expense is required for this purpose since the indexing of each individual code is already defined by the aforementioned, fixed relationship.

If it is assumed that the counter of receiver 2 and the transmitter 1 were at one time synchronized, then it can be assumed that the next valid code follows in sequence the code to which the receiver is set. Thus, the receiver need only sequence through the sequence of codes until it finds a match for a transmitted code. The code following the transmitted code is assumed to be the next valid code.

The lock, however, is not activated or opened at this point. Because in the initial reception there was no match between the transmitted code and the code to which the receiver was set, no signal 9 was generated at the output 8. Thus, if the transmitters 1 and receivers 2 are out of sync, at least two transmissions are required to activate and open the lock. That is to say, the next valid code must be transmitted.

But permitting two such transmissions to open the lock presents further problems, i.e., only two unauthorized transmissions are needed to open the lock. Thus, it would appear that very little reduction in the deterence or avoidance of activation of the lock by unauthorized transmissions would be accomplished. Thus, the present invention employs further steps to avoid this problem.

To this end, the indexer or counter in receiver 2 can be sequentially shifted through codes in the sequence following the code at which the receiver is initially set upon reception of a transmitted code only up to a prescribed limit. This limit is defined as being small in comparison to the overall number of codes in the sequence. That is to say, the receiver indexer or counter can only be incremented by a limited number of times while it searches for a match to determine the next valid code. Otherwise, the unauthorized reception of two arbitrary successive codes would activate the electronic lock as set forth above. On the basis of this limitation, however, such a code combination is briefly effective only after a time of unknown duration. Furthermore, it can be appreciated that the transmitter can be allowed to transmit without reception only once less than the number of times that the receiver counter can be shifted. Otherwise, the transmitter 1 and receiver 2 cannot be made to synchronize without going through all n codes.

As an example, in accordance with the invention, if a received code is other than the code to which the receiver is set, then the receiver counter is set to the next code in the sequence. A comparison is made between the received code and the code to which the receiver is newly set. If there is no match, then the receiver counter is again set to yet the next code of the sequence, and so on. This process or comparison cycle continues until there is a match or until the counter reaches its limit, whichever occurs first. The number of times the counter can be incremented is small compared to the overall number of codes. Thus, if this limit is b 10, then only 9 unreceived transmissions are permitted if synchronization is to be achieved. The 10th transmission must be received or else synchronization can only occur after transmission of n minus 10 codes by the transmitter 1. This method is also set forth in the flow chart of FIG. 2.

Figure 2:
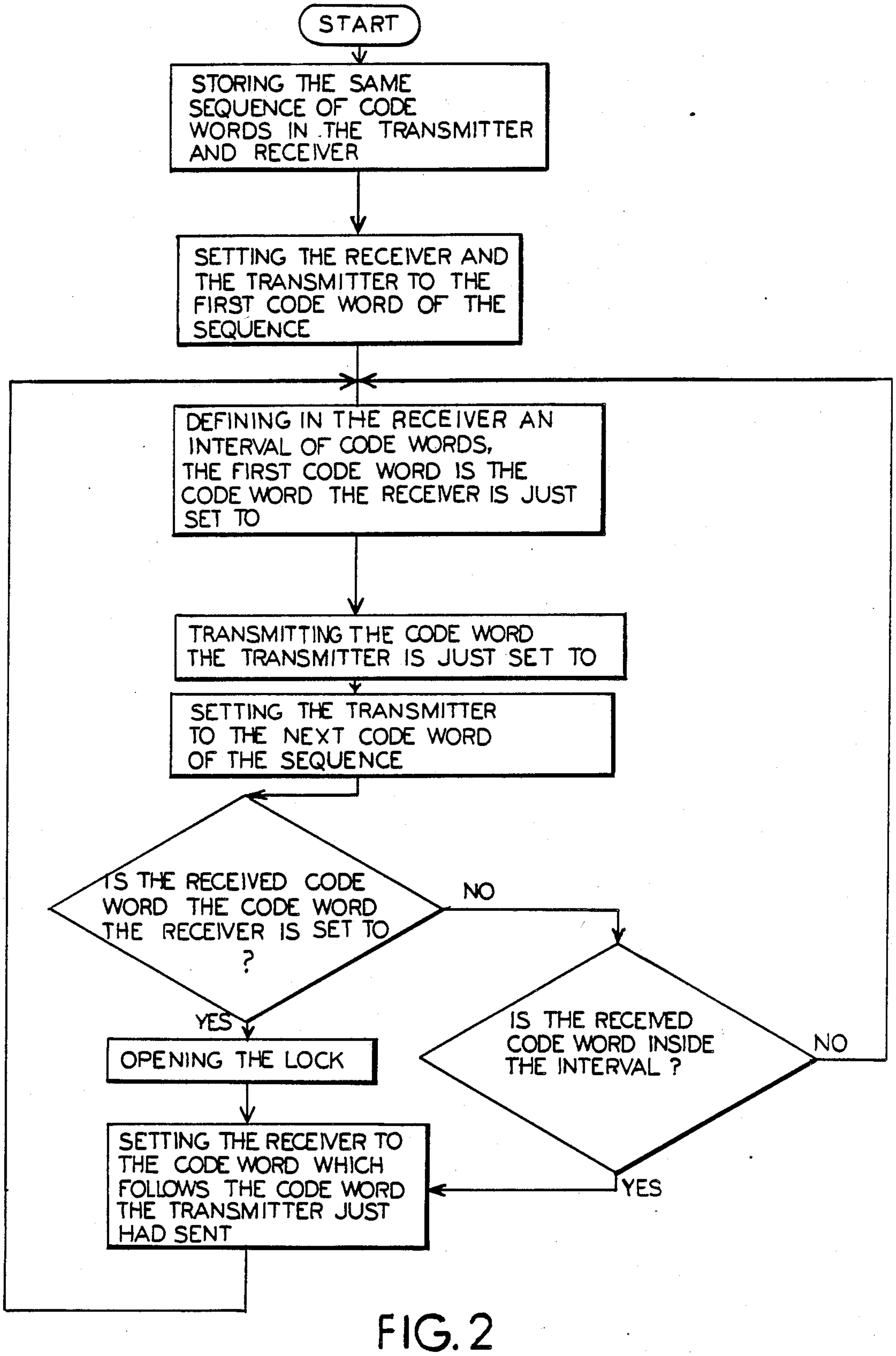
FIG. 2 is a flow chart illustrating a method for a lock system embodying principles of the invention.

As also illustrated in FIG. 2, if a match is found within the limited range of search accorded by the above method, then the lock is permitted to open upon the receipt of the next valid code. If no match is found, then the receiver counter is left set to the last code in the sequence with which it made a comparison.

A method of the present invention allows an electronic key for an electronic lock, such as an electronic lock for motor vehicles, to be designed in a theft proof and simple manner, whereby synchronization between the transmitter and the receiver is set should an asynchronism between the transmitter and the receiver initially exist due to mistaken transmission of signals. The transmitter can therefore be designed, for example, on the order of the size of a matchbox so that it can be comfortably carried.

While a preferred embodiment has been shown, modifications and changes may become apparent to those skilled in the art which shall fall within the spirit and scope of the invention. It is intended that such modifications and changes be covered by the attached claims.

I claim:

1. In a method of code protection of an electronic key system for operating a lock, of the type in which a code is transmitted from a transmitter to a receiver via an infrared signal, and in which the receiver responds to the receiver code to produce an unlocking signal for the lock, the improvement comprising the steps of:

determining an identical sequence of codes in the transmitter and in the receiver;

transmitting a code of the sequence from the transmitter to the receiver for an unlocking event;

setting the transmitter to the next code of the sequence following the transmitted code;

comparing, at the receiver, the received code with a code in which the receiver is set;

opening the lock of the received code matches the code to which the receiver is set;

stepping said receiver through an interval of codes following the code to which the receiver is set if the received code is other than the code to which the receiver is set by sequentially comparing said received code with the remaining codes following the code to which the receiver is set;

limiting the number of times said receiver is stepped through said interval in response to the reception of a code other than the one to which the receiver is set to a number of times less than the total number of codes in the sequence; and setting the receiver to a code in the sequence following the code the transmitter just transmitted only if the received code is one of the codes in the interval.

* * * * *